United States Patent [19]

Onodera

[11] 4,023,376

[45] May 17, 1977

[54] FOOD REFRIGERATING METHOD

[76] Inventor: Hirohumi Onodera, 340, Mizuhai, Higashiosaka Osaka, Japan

[22] Filed: July 31, 1975

[21] Appl. No.: 600,849

[30] Foreign Application Priority Data

May 31, 1975 Japan .............................. 50-66817

[52] U.S. Cl. ...................................... 62/63; 62/93
[51] Int. Cl.$^2$ ...................................... F25D 17/02
[58] Field of Search .............. 62/63, 223, 381, 378, 62/93

[56] References Cited

UNITED STATES PATENTS

| | | | |
|---|---|---|---|
| 3,269,142 | 8/1966 | DeMola et al. ....................... | 62/381 |
| 3,866,432 | 2/1975 | Harrison .............................. | 62/381 |

*Primary Examiner*—Ronald C. Capossela

*Attorney, Agent, or Firm*—Wenderoth, Lind & Ponack

[57] ABSTRACT

A method for refrigerating food. This method, preferably applicable to a food refrigerating apparatus of a corkscrew belt conveyor system, discloses the provision of an air cooler for said apparatus without a limit on where to dispose it but any suitable position in or out of said apparatus. Said air cooler sprays freezing air over the food placed on the moving belt conveyor until the completion of its predetermined distance of trip, the air along said belt conveyor being dehumidified through its gradual cooling in this process thereby enabling the prevention of accommodated constituents from developing frosting of freezing on their surfaces. Said air cooler functions on coolant gas supplied from a container subject to the control of a valve and a thermostat according to temperatures required for the food refrigeration.

4 Claims, 4 Drawing Figures

FOOD REFRIGERATING METHOD

This invention relates to a food refrigerating method and more particularly a food refrigerating method preferably applicable to a food refrigerating apparatus of a corkscrew belt conveyor system, said method disclosing the provision of an air cooler for such an apparatus as above without prescribing where to dispose it but preferring a suitable position in or out of said apparatus, said air cooler spraying freezing air over the food until completion of its predetermined distance of trip on said belt conveyor with a result that the air therealong is dehumidified, thereby preventing the accommodating constituents from frosting or freezing on their surfaces. Said air cooler functions on coolent gas supplied from a container under the control of a valve and a thermostat according to temperatures required for the food refrigeration.

In known food refrigeration methods, coolant gas is sprayed directly overthe food without cooling its surrounding air with a likely result that frosting or freezing is caused on the surface of concerned mechanism.

A main object of this invention is to provide a food refrigerating method preferably applicable to a food refrigerating apparatus of a corkscrew belt conveyor system, wherein an air cooler is provided anywhere at a suitable position so as to spray freezing air over the food on its belt-loaded trip until completion of said trip as predetermined, the air along said belt being dehumidified in the process of its gradual cooling, thereby preventing the accommodating mechanisms from frosting or freezing on their surfaces.

So that this invention may be readily understood, a reference will be made to preferred embodiments of a food refrigerating apparatus as above-mentioned in relation to the annexed drawings as follows.

Figure 1:
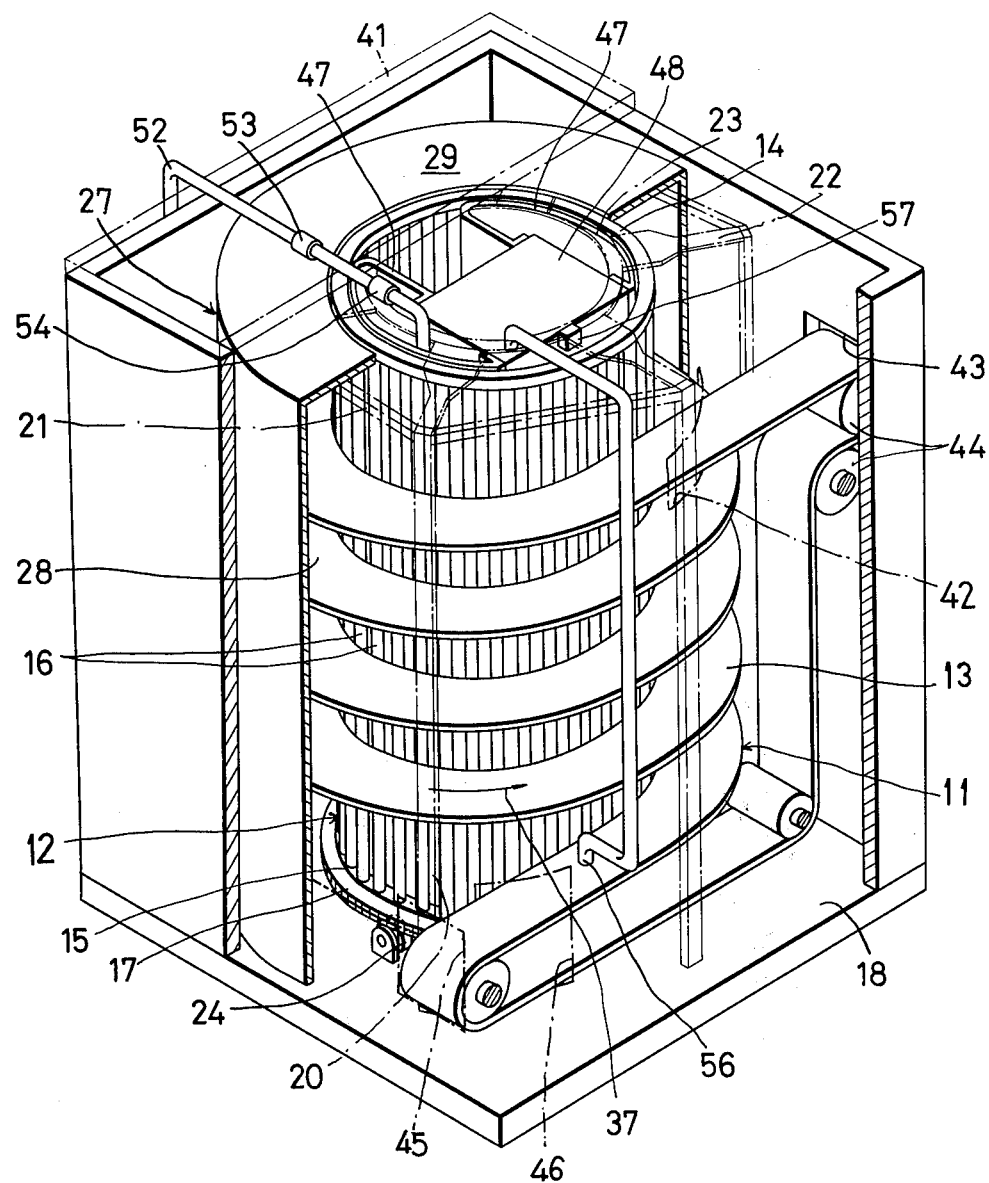
FIG. 1 is a partially broken perspective view of said apparatus in the first embodiment.
Figure 2:
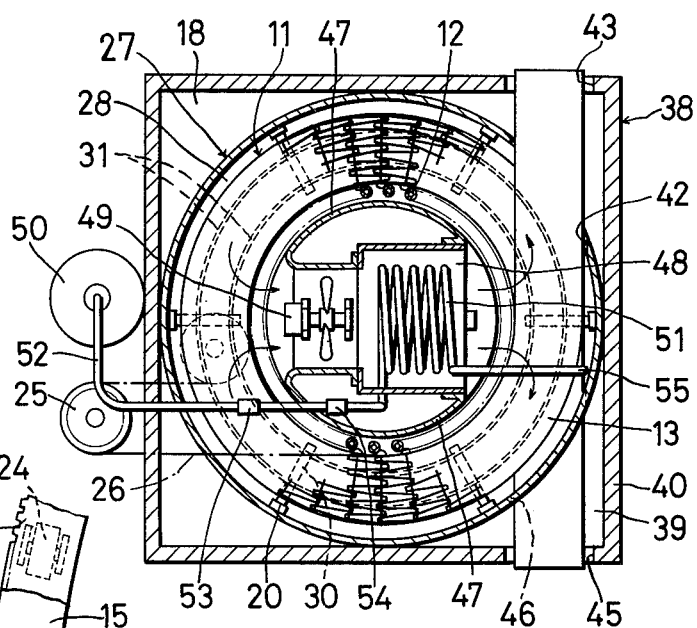
FIG. 2 is a transverse sectional plan view of FIG. 1.
Figure 3:
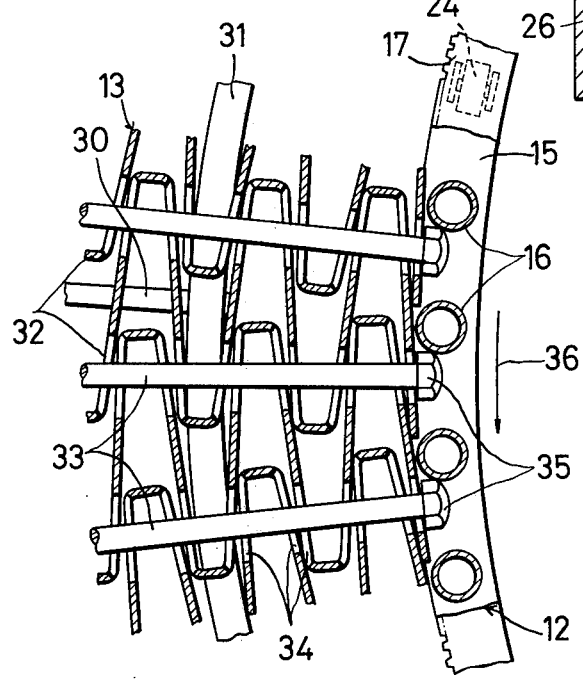
FIG. 3 is a transverse sectional view in magnified scale showing important parts of a belt conveyor in the above-mentioned apparatus.

In the first embodiment shown in FIGS. 1 to 3, a corkscrew belt conveyor 11 comprising a rotary drum 12 and a belt 13 is disposed so as to spirally extend upwardly around said drum 12, and a base panel 18 of this invention apparatus is on which provided all of the components of said apparatus are arranged.

Said drum 12 is formed of an annular upper frame 14 and an annular lower frame 15 confronting vertically each other with a plurality of bars 16 vertically extending between said upper and lower frames 14 and 15 at predetermined intervals to each other, said bars 16 being fixed at their upper and lower ends respectively to said upper frame 14 and lower frame 15. Said drum 12, as may be self-explanatory in its peripheral construction described above, allows a free flow of air therein and thereout. To the under surface of said lower frame 15 of said drum 12 is axially fixed an annular sprocket 17 diametrically larger than the lower frame 15.

On the base panel 18 is mounted a propping frame 19 consisting of vertical pillars 20, rods 21 connecting said pillars 20 at their upper ends, and an annular frame 23 supported by arms 22 which extend inwardly from said vertical pillars 20 at their upper ends. These constituents are formed of square pipes, shape steels, and etc.

Said drum 12 located within said frame 19 is supported rotatably at its lower frame 15 by a plurality of rollers 24 disposed annularly on said base panel 18 and also at its upper frame 14 by rollers (not shown) fitted to said arms 22 of said frame 19. Said drum 12 is driven in its rotary movement by a motor 25 placed outside said base panel 18 via a chain 26 linking with said sprocket 17 fixed to the lower portion of said drum 12.

The drum 12 at its outer periphery is surrounded by a cylindrical casing 27 erected on said base panel 18, said casing 27 axially fixed to said pillars 20 so as to be positioned outside said frame 19.

Said casing 27 forms a circular space 28 between the inner peripheral surface thereof and the outer periphery of said drum 12, said space 28 being substantially a cooled air zone wherein food is refrigerated on its belt-loaded spiral trip therethrough.

Said casing 27 is fixed at its lower end to the base panel 18 and at its upper end is provided with an annular wall 29, said wall 29 abutting on said upper frame 14 of said drum 12 so as to close said space 28 at its upper end.

Within said refrigerating space 28 is a guide rail 31 spirally and vertically positioned around said drum 12, said rail 31 being propped by arms 30 projecting from every pillar 20 of said propping frame 19, said guide rail 31 slanting mildly in its corkscrew extension forming a plurality of steps.

The afore-mentioned belt 13 is laid so as to move on said guide rail 31 at the outer periphery of said drum 12 accompanied with the rotation of said drum 12, the movement of said belt 13 in relation with the rotation of said drum 12 being manifested in the following manner.

The belt 13 is constituted so as to be readily bendable or twistable either longitudinally or transversely. One example of the belt 13 is shown in FIG. 3 wherein said belt 13 comprises a number of corrugated sheets 32 laid on their side, their wavy surfaces facing in the belt moving direction in the state such that one sheet 32 fits at its projective portions from behind in the recess portions of the other sheet 32, whereby said sheets 32 are firmly connected by means of axes 33 each extending through holes 34 through said sheets 32 at their fitting portions in front and in rear.

Said axes 33 at both ends thereof each form a magnified projection 35 for preventing said axes from slipping off. Each projection 35 also enables the belt 13 to engage said drum 12 by the engagement of said projections 35 with said bars 16 of said drum 12 in its rotating direction thereby enabling said belt 13 to spirally move upward accompanied by the counterclockwise rotation of said drum 12 as indicated by arrow 37 in FIG. 1.

Further, the afore-mentioned cylindrical casing 27 is enveloped by a box-shaped adiabatic casing 38. The space between said casing 27 at its outer periphery and said casing 38 at its inside periphery acts more or less to cool infiltrated atmospheric air before it reaches said cooled air zone 28.

Said adiabatic casing 38 is constituted by a peripheral wall 40 erected on said base panel 18 and a ceiling wall 41 closing the upper opening of said peripheral wall 40. Said base panel 18, which eventually partakes of this casing constitution, is applied with adiabatic treatment.

Guide rolls 44 are provided at the upper opening 43 and lower opening 45 of said adiabatic casing 38 and further at a cornering spot inside said casing 38 so as to support said belt 13 in an endlessly circulating state, whereby the food to be frozen is placed on said belt 13 through said opening 45, thereby starting on its belt-loaded freezing trip until removed as a frozen food out of said upper opening 43. The inner casing 27 also is provided with an upper opening 42 and lower opening 46 so as to correspond with said upper and lower openings 43 and 45 respectively for allowing the extension of said belt 13 therethrough.

The inside space of said drum 12 is partitioned by a pair of vertical longitudinal, sectionally-arched wall members 47 fixedly erected on said base panel 18 and fixed at their upper ends to said propping frame 19. Said partitioning members 47 enable the minimization of said refrigerating space 28 while simultaneously fixing the air circulating direction in the spirally moving direction of said belt 13.

Inside said drum 12 inbetween said partitioning walls 47 are installed an air cooler 48 and a plurality of air blowing fans 49, said cooler 48 being so constituted as to enable the passage of air therethrough after it blows past said fans 49 between said walls 47, as indicated by arrows in FIG. 2. The cooled air splits in two directions inside said casing 27, thereby flowing through said refrigerating space 28 parallel with said belt 13, and then turns back into said cooler 48 from behind said fans 49, thereby effectively cooling said refrigerating zone 28 so that food may be satisfactorily frozen during its belt conveyance as detailed hereinbefore.

Outside said adiabatic casing 38 is a container 50 for storing liquid coolant, the outlet of said container connects to a fin-attached winding tube 51 of said cooler 48 via a pipe 52, said pipe 52 intermediately having a control valve 53 for controlling the spurt of said liquid coolant from said container 50. A nozzle 54 is adapted adjacent said cooler 48 for vaporizing said liquid coolant. Said cooler 48 also can obtain the same cooling effect without using said coolant by means of inducing cooled air from any other cooling device via pipes.

Said fin-attached tube 51 of said cooler 48 connects to a pipe 55 at the upper portion of said cooler 48. Said pipe 55 faces downward at its outlet within said casing 27, thereby enabling the coolant once used in said cooler 48 to flow through said pipe 55 downward under the control of a nozzle 56 fitted to the lower end of said pipe 55, said coolant thereby spraying over said belt 13 so as to add to the air-cooled food refrigerating effect provided by said cooler 48 as detailed hereinbefore.

A thermostat is disposed at any suitable position within said drum 12, for instance at the upper portion of said cooler 48 as shown in FIG. 1, electrically connecting to the afore-mentioned control valve 53, thereby enabling automatic control of the spurt of the coolant from said container 50 and, accordingly, the maintenance of predetermined freezing temperatures within said cooling space 28.

The adiabatic case 38 may be provided with a curtain (not shown) at its opening 43 and 45 for reducing the infiltration of atmospheric air therein.

A further modification of this apparatus is possible; that is, said adiabatic casing 38 is dispensed with and said inner casing 28 is applied instead with adiabatic treatment when this apparatus is used in comparatively less-humid circumstances.

The foregoing refrigerator of the first embodiment functions as follows.

With the counterclockwise rotation of said drum 12 driven by the motor 25, said belt 13 moves spirally in the drum rotating direction. Simultaneously the liquid coolant begins pouring forth from said container 50 to said cooler 48 under the control of said control valve 53 in combination with said thermostat 57, and said coolant passes through said pipe 52 and through said nozzle 54, thereby being vaporized before reaching said cooler 48. The air blowing fans 49 also begin rotary movement by their own motors, while food to be frozen is placed on said belt 13 through said openings 45 and 46 in a proper time.

The air caused to stream by said fans 49 is cooled through thermal exchange at said fin-attached tube 51 thence moving in circulation within said space 28 in the arrows-marked direction as shown in FIG. 2.

The food refrigerated through its gyrating trip on said belt 13 within said cooled space 28 is taken from the upper opening 43 of said casing 38. In this refrigerating operation, the food is cooled evenly by the circulation of the cold air current within said space 28.

The space 39 between said adiabatic casing 38 and said inner casing 27 allows cooling of humid air possibly infiltrating from outside of said casing 38, said humid air being dehumidified through said preventive cooling before reaching said space 28, thereby preventing the development of frost or freezing of said humid air on the surface of the mechanism in this apparatus.

Figure 4:
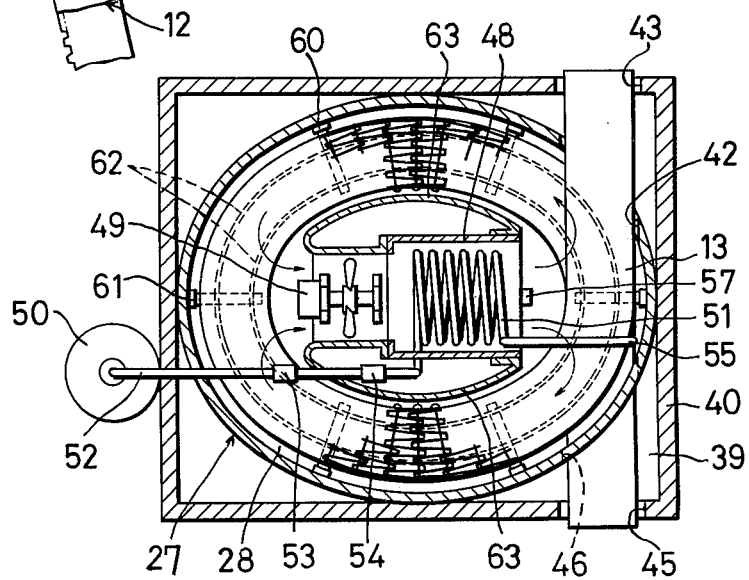
FIG. 4 is a transverse sectional plan view of the above-mentioned apparatus in the second embodiment.

The second embodiment of said apparatus is explained in relation with FIG. 4 wherein constituents equivalent to those in FIGS. 1 – 3 are designated by the same numerals.

The second embodiment discloses a modification of the belt driving means wherein said drum 12 is dispensed with and, instead, an elliptical belt supporting frame is provided. Vertical pillars 61 attached to said support frame enable the layout of a guide rail 62 so as to spirally extend upward, said belt 13 being laid also along said rail 62 and being moved by motorized rollers (not shown) equipped suitably at curved portions of said belt 13 or by motorized wheels (not shown) engaging with shafts 33 of said belt 13. The cooler 48 and air blowing fans 49 are accommodated inbetween a pair of partitioning walls 63 formed within this elliptical space.

This second embodiment, however, is not intended to limit the shape of the belt conveyor system, i.e. said elliptic form may be replaced with a circular form or a lengthy elliptic form wherein a pair of drums for moving said belt 13 may be provided.

Further, in either embodiment, a plural number of coolers may be accommodated in this refrigerating apparatus as need, whereby partitioning plates may be provided between said coolers in accordance with the requirements for the flow direction of the cooled air.

As described hereinbefore, this invention enables the effectuation of a food refrigeration through its belt-loaded spiral trip of a predetermined distance within a narrow space wherein an air cooler disposed anywhere at a suitable position provides cooled air in a dehumidified state. The above situation makes possible the freezing of food as required while preventing the device from frosting or freezing its surfaces, said frosting or freezing being likely to result from spraying of coolant without cooling the air as is the usual practice with conventional belt-conveying food refrigerating apparatuses.

As may be apparent in the foregoing description, the air within this apparatus is dehumidified through a gradual temperature reduction under the function of said air cooler, and accordingly no frosting or freezing occurs on the incorporated parts if the coolant once used through said cooler sprays in the food refrigerating space to add to the food refrigerating effect.

What is claimed is:

1. A method for refrigerating food items and the like comprising:
    positioning a vertically-spiral endless belt conveyor for carrying thereon said items to be refrigerated within a cylindrical partition wall for thermally insulating said conveyor from the atmosphere, said cylindrical wall having a plurality of openings therethrough surrounding said conveyor for allowing said conveyor to pass therethrough;
    moving said belt conveyor by engaging it with a motor driven rotary cylindrical framework positioned inside the center of said spiral belt conveyor;
    passing cold air over said belt conveyor moving between said cylindrical wall and said cylindrical framework, whereby said food placed on said conveyor is refrigerated; and
    positioning an external adiabatic partition wall around said cylindrical framework, said belt conveyor, and said cylindrical wall, to provide a space for preliminarily cooling and dehumidifying atmospheric air before it passes into the space surrounding said belt conveyor between said cylindrical framework and said cylindrical wall, said external wall also having a plurality of openings therethrough corresponding to the openings in said cylindrical wall and surrounding said belt conveyor for allowing said belt conveyor to pass through said external wall and to allow food to be placed on said conveyor belt and removed therefrom.

2. A method as claimed in claim 1, wherein said cold air passing over said conveyor comes from air-cooling means positioned inside said cylindrical framework, said air-cooling means having at least one fan to blow cold air outward therefrom across said belt conveyor.

3. A method as claimed in claim 1, wherein said cold air passing over said conveyor comes from air-cooling means positioned between said cylindrical partition wall and said external partition wall, said air-cooling means having at least one fan to blow cold air outward therefrom across said belt conveyor.

4. A method as claimed in claim 1, wherein said cold air passing over said conveyor comes from air-cooling means positioned outside of said external partitioned wall and directed into the space between said cylindrical wall and said external partition wall, said air-cooling means having at least one fan to blow cold air therefrom across said belt conveyor between said walls.

* * * * *